(12) United States Patent
Hart et al.

(10) Patent No.: US 7,301,313 B1
(45) Date of Patent: Nov. 27, 2007

(54) MULTIPLE VOLTAGE REGULATORS FOR USE WITH A SINGLE LOAD

(75) Inventors: Frank P. Hart, Beaverton, OR (US); Don J. Nguyen, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/275,273

(22) Filed: Mar. 23, 1999

(51) Int. Cl.
*G05F 1/10* (2006.01)
(52) U.S. Cl. .......................... 323/269; 307/74
(58) Field of Classification Search ............ 307/43–87; 323/234–298; 713/300–340
See application file for complete search history.

(56) References Cited

U.S. PATENT DOCUMENTS

| | | | |
|---|---|---|---|
| 2,092,891 A * | 9/1937 | Overbeck | 363/76 |
| 2,322,955 A * | 6/1943 | Perkins | 307/48 |
| 3,151,289 A * | 9/1964 | Harpley | 323/284 |
| 3,356,855 A * | 12/1967 | Suzuki et al. | 307/53 |
| 3,414,802 A * | 12/1968 | Harrigan et al. | 363/89 |
| 3,521,150 A * | 7/1970 | Bates | 323/272 |
| 3,740,569 A * | 6/1973 | Carcia | 307/11 |
| 3,808,452 A * | 4/1974 | Hutchinson | 307/64 |
| 3,811,050 A * | 5/1974 | Michelet et al. | 307/64 |
| 3,824,450 A * | 7/1974 | Johnson et al. | 323/272 |
| 3,886,438 A * | 5/1975 | Bouman | 323/275 |
| 3,949,238 A * | 4/1976 | Brookes | 307/64 |
| 3,956,638 A * | 5/1976 | Ahrens et al. | 307/48 |
| 3,971,957 A * | 7/1976 | Hase | 307/64 |
| 3,991,319 A * | 11/1976 | Servos et al. | 307/64 |
| 4,010,381 A * | 3/1977 | Fickenscher et al. | 307/66 |
| 4,074,182 A * | 2/1978 | Weischedel | 307/82 |
| 4,177,389 A * | 12/1979 | Schott | 307/64 |
| 4,194,147 A * | 3/1980 | Payne et al. | 307/53 |
| 4,327,298 A * | 4/1982 | Burgin | 307/66 |
| 4,359,679 A * | 11/1982 | Regan | 323/272 |
| 4,426,615 A * | 1/1984 | Hannas | 323/272 |
| 4,476,399 A * | 10/1984 | Yoshida et al. | 307/44 |
| 4,538,073 A * | 8/1985 | Freige et al. | 307/33 |
| 4,611,162 A * | 9/1986 | Erratico et al. | 323/269 |
| 4,618,779 A * | 10/1986 | Wiscombe | 307/60 |
| 4,635,178 A * | 1/1987 | Greenhalgh | 363/65 |

(Continued)

FOREIGN PATENT DOCUMENTS

CH     680691 A   * 10/1992

(Continued)

*Primary Examiner*—Paul R. Myers
(74) *Attorney, Agent, or Firm*—Blakely, Sokoloff, Taylor & Zafman LLP

(57) ABSTRACT

Multiple voltage regulators for use with a single load. The present invention allows power to be supplied to an electrical load using multiple voltage regulators based on the operating environment of the load. In one embodiment, a primary voltage regulator that is built of relatively low capacity and relatively high efficiency components is used to supply power from a limited power source. A secondary voltage regulator built of higher capacity and possibly lower efficiency components is used when power is from a less limited source. In one embodiment, a tertiary voltage regulator is used that is built of possibly higher capacity and lower efficiency components to provide even more power. It is important to note that use of voltage regulators as described herein does not require that higher capacity voltage regulators be less efficient than lower capacity voltage regulators.

6 Claims, 5 Drawing Sheets

U.S. PATENT DOCUMENTS

| | | | |
|---|---|---|---|
| 4,648,020 A * | 3/1987 | Vinciarelli | 323/272 |
| 4,675,770 A * | 6/1987 | Johansson | 361/103 |
| 4,677,311 A * | 6/1987 | Morita | 307/66 |
| 4,701,690 A * | 10/1987 | Fernandez et al. | 307/64 |
| 4,728,807 A * | 3/1988 | Harafuji et al. | 307/52 |
| 4,766,364 A * | 8/1988 | Biamonte et al. | 307/82 |
| 4,779,007 A * | 10/1988 | Schlanger et al. | 307/66 |
| 4,879,504 A * | 11/1989 | McVey | 323/272 |
| 4,920,309 A * | 4/1990 | Szepesi | 307/58 |
| 4,924,170 A * | 5/1990 | Henze | 323/272 |
| 5,122,726 A * | 6/1992 | Elliott et al. | 323/272 |
| 5,185,567 A * | 2/1993 | Uchida | 323/267 |
| 5,214,311 A * | 5/1993 | Kageyama et al. | 307/18 |
| 5,319,536 A * | 6/1994 | Malik | 363/65 |
| 5,420,783 A * | 5/1995 | Gross | 323/268 |
| 5,450,003 A * | 9/1995 | Cheon | 323/272 |
| 5,483,464 A * | 1/1996 | Song | 713/300 |
| 5,493,155 A * | 2/1996 | Okamoto et al. | 307/45 |
| 5,532,524 A * | 7/1996 | Townsley et al. | 307/64 |
| 5,557,738 A * | 9/1996 | Townsley et al. | 714/14 |
| 5,563,493 A * | 10/1996 | Matsuda et al. | 320/124 |
| 5,594,321 A * | 1/1997 | Kohl et al. | 361/18 |
| 5,598,089 A * | 1/1997 | Shintomi | 320/128 |
| 5,630,148 A * | 5/1997 | Norris | 713/322 |
| 5,659,208 A * | 8/1997 | Kimble et al. | 307/82 |
| 5,672,958 A * | 9/1997 | Brown et al. | 307/53 |
| 5,723,972 A * | 3/1998 | Bartol et al. | 307/10.7 |
| 5,739,596 A * | 4/1998 | Takizawa et al. | 307/66 |
| 5,761,084 A * | 6/1998 | Edwards | 700/293 |
| 5,838,929 A * | 11/1998 | Tanikawa | 710/302 |
| 5,912,514 A * | 6/1999 | Stendardo et al. | 307/64 |
| 5,926,394 A | 7/1999 | Nguyen et al. | |
| 5,939,801 A * | 8/1999 | Bouffard et al. | 307/65 |
| 5,994,793 A * | 11/1999 | Bobry | 307/64 |
| 6,035,261 A * | 3/2000 | Carpenter et al. | 370/64 |
| 6,035,358 A * | 3/2000 | Tanikawa | |
| 6,038,633 A * | 3/2000 | Tavallaei | |
| 6,078,109 A * | 6/2000 | Yanagisawa | 307/18 |
| 6,191,943 B1 * | 2/2001 | Tracy | |
| 6,239,997 B1 * | 5/2001 | Deng | 363/95 |
| 6,255,622 B1 * | 7/2001 | May et al. | |
| 6,259,601 B1 * | 7/2001 | Jagers et al. | |
| 6,268,716 B1 * | 7/2001 | Burstein et al. | 323/272 |
| 6,275,958 B1 * | 8/2001 | Carpenter et al. | 307/82 |
| 6,288,951 B1 * | 9/2001 | Chen et al. | 365/189.09 |
| 6,304,824 B1 * | 10/2001 | Bausch et al. | 702/64 |
| 6,384,577 B1 * | 5/2002 | Kikuchi et al. | 320/134 |

FOREIGN PATENT DOCUMENTS

FR            2556518 A1 * 6/1985

* cited by examiner

MULTIPLE VOLTAGE REGULATORS FOR USE WITH A SINGLE LOAD

FIELD OF THE INVENTION

The present invention relates to computer systems. More particularly, the present invention relates to use of multiple voltage regulators with a single load based on operating conditions.

BACKGROUND OF THE INVENTION

Prior art electrical systems such as computer systems typically include an electrical load such as a processor coupled to receive power from a power supply circuit under control of a voltage regulator (VR). In desktop computer systems, such a configuration is appropriate because operating conditions, such as power source and power management functions generally do not vary significantly over time. In other words, desktop computer systems typically run at full speed and at full power at all times.

Mobile computer systems, in contrast to desktop computer systems, operate under a variety of operating conditions. For example, when power is supplied from a battery only, the power source is limited and power management functions are active to reduce unnecessary power usage. When power is supplied via an AC adapter, the power source is not limited, but thermal dissipation capabilities are typically less than those available in desktop computer systems. Reduced thermal dissipation capacity limits mobile computer system performance to less than desktop computer system performance even when the power source is not limited.

Prior art electrical systems are typically designed for optimal power supply performance under certain conditions and sub-optimal performance under other conditions. Alternatively, prior art electrical systems are designed for balanced performance under multiple operating conditions, which results in sub-optimal power supply performance at all times.

What is needed is a method and apparatus for improved power supply performance under varying operating conditions.

SUMMARY OF THE INVENTION

Use of multiple voltage regulators with a single load is described. An electrical load is coupled to receive power via a primary voltage regulator coupled to supply a first amount of power. The primary voltage regulator includes a feedback circuit for detecting power supplied to the load and for controlling additional voltage regulators. A secondary voltage regulator is coupled to supply a second amount of power to the load, the secondary voltage regulator coupled to and controlled by the feedback circuit.

BRIEF DESCRIPTION OF THE DRAWINGS

The present invention is illustrated by way of example, and not by way of limitation, in the figures of the accompanying drawings in which like reference numerals refer to similar elements.

DETAILED DESCRIPTION

Use of multiple voltage regulators with a single load is described. In the following description, for purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid obscuring the present invention.

The present invention allows power to be supplied to an electrical load using multiple voltage regulators based on the operating environment of the load. In one embodiment, a primary voltage regulator that is built of relatively low capacity and relatively high efficiency components is used to supply power from a limited power source. A secondary voltage regulator built of higher capacity and possibly lower efficiency components is used when power is from a less limited source. In one embodiment, a tertiary voltage regulator is used that is built of possibly higher capacity and lower efficiency components to provide even more power. It is important to note that use of voltage regulators as described herein does not require that higher capacity voltage regulators be less efficient than lower capacity voltage regulators.

Figure 1:
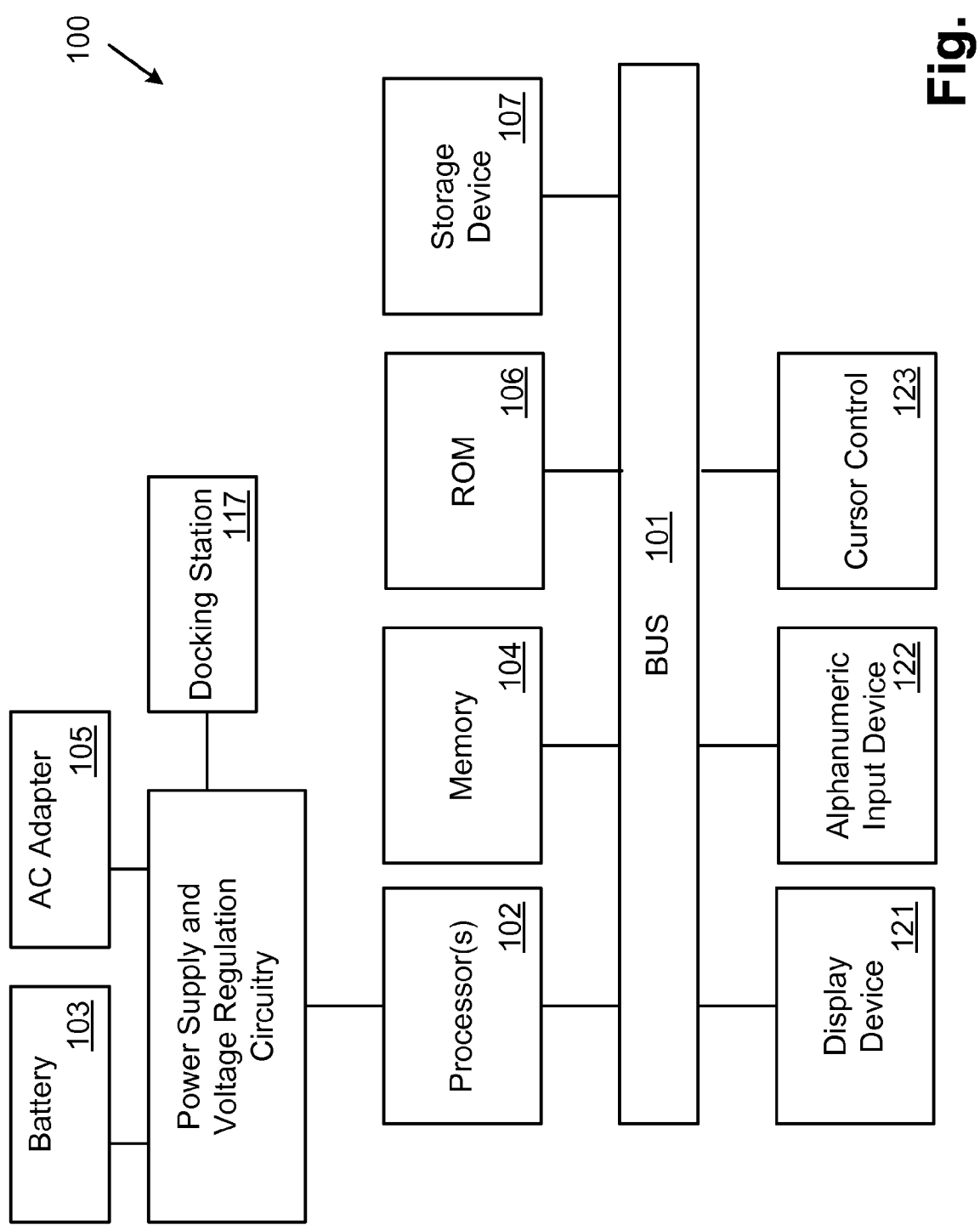
FIG. 1 is one embodiment of a computer system.

FIG. 1 is one embodiment of a computer system. Computer system 100 includes bus 101 or other communication means for communicating information, and processor 102 coupled with bus 101 for processing information. Computer system 100 further includes random access memory (RAM) or other dynamic storage device 104 (referred to as main memory), coupled to bus 101 for storing information and instructions to be executed by processor 102. Main memory 104 also can be used for storing temporary variables or other intermediate information during execution of instructions by processor 102. Computer system 100 also includes read only memory (ROM) and/or other static storage device 106 coupled to bus 101 for storing static information and instructions for processor 102. Data storage device 107 is coupled to bus 101 for storing information and instructions.

Processor 102 can have power supplied by using voltage regulator configurations as described below. Use of the voltage regulator configuration described below thermal hot spots can be reduced as compared to single voltage regulator configurations. Also, a multiple voltage regulator system can avoid many of the design compromises required by single voltage regulator systems.

Data storage device 107 such as a magnetic disk or optical disc and corresponding drive can be coupled to computer system 100. Computer system 100 can also be coupled via bus 101 to display device 121, such as a cathode ray tube (CRT) or liquid crystal display (LCD), for displaying information to a computer user. Alphanumeric input device 122, including alphanumeric and other keys, is typically coupled to bus 101 for communicating information and command selections to processor 102. Another type of user input device is cursor control 123, such as a mouse, a trackball, or cursor direction keys for communicating direction information and command selections to processor 102 and for controlling cursor movement on display 121.

Figure 2:
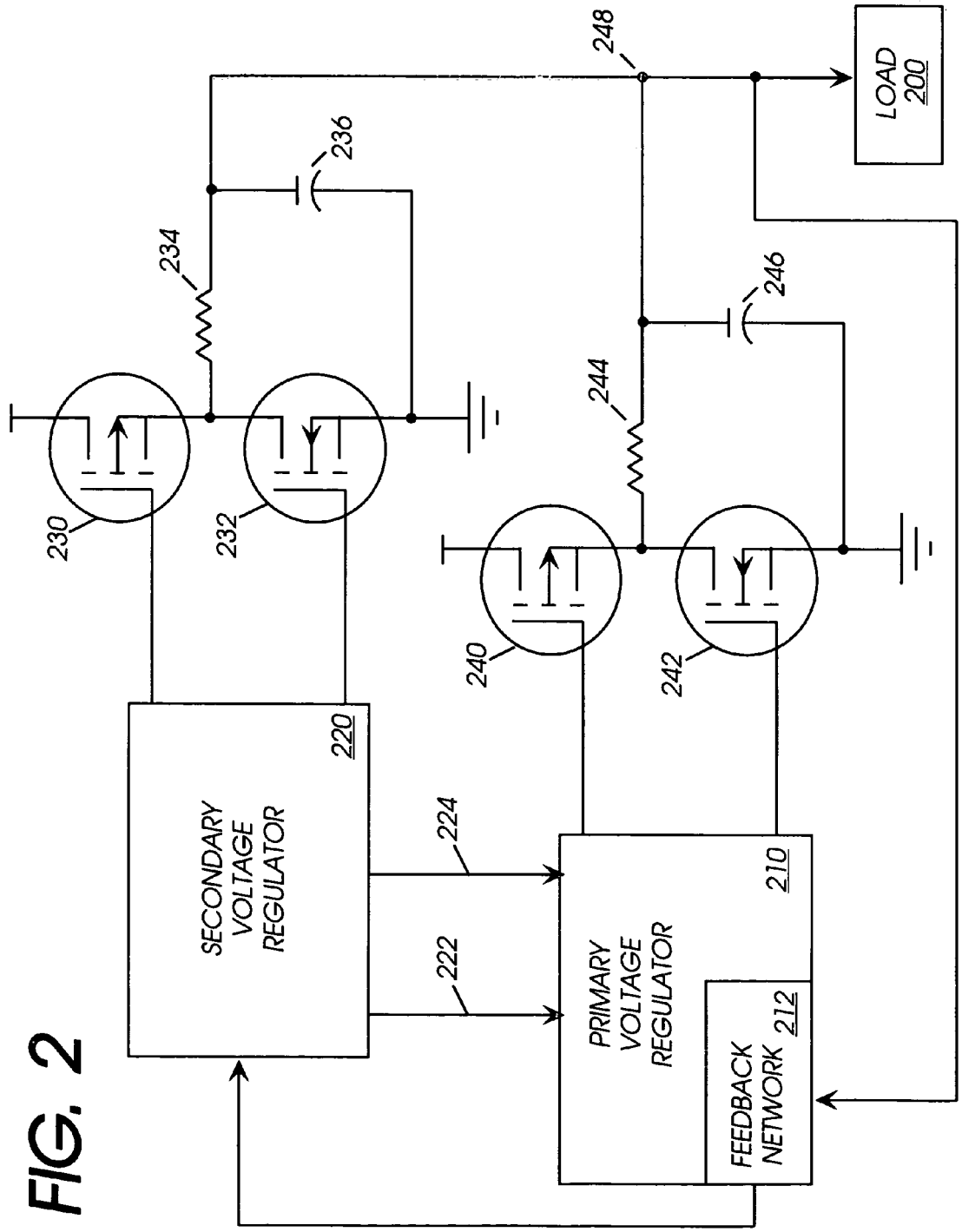
FIG. 2 is one embodiment of a tool voltage regulator, single load system.

FIG. 2 is one embodiment of a dual voltage regulator, single load system. In one embodiment, the two voltage regulators provide power to the load based on operating conditions. Operating conditions can include, for example, power source (e.g., battery 103, AC line 105), thermal environment (e.g., heat sinks, fans, operating temperature), circuit board layout (e.g., whether the voltage regulator and the load are on the same board), etc.

In one embodiment, primary voltage regulator 210 supplies power to load 200 at all times that power is being supplied. Load 200 can be, for example, a processor. Load 200 can also include additional or different components. Secondary voltage regulator 220 supplies power to load 200 under certain operating conditions, as described in greater detail below. In order to keep current flowing to load 200, the voltage supplied by secondary voltage regulator 220 is greater than the voltage provided by primary voltage regulator 210.

The system of FIG. 2 can be, for example, a mobile computer system. In such an embodiment, primary voltage regulator 210 provides power to load 200 when power is supplied to the system through a battery. Because batteries provide a limited power source, the components associated with primary voltage regulator 210 are high efficiency components. Also, because mobile computer system are small and lightweight, the components of, and associated with, primary voltage regulator 210 may be relatively small components, which generally limits the components to a relative low capacity. In one embodiment, primary voltage regulator 210 provides 8 Watts of power to load 200. Thus, in one embodiment primary voltage regulator 210 is a small, high efficiency voltage regulator.

The basic functions of primary voltage regulator 210 can be implemented in any manner known in the art with functional modifications as described below. In one embodiment, primary voltage regulator 210 receives two input signals from secondary voltage regulator 220 and further includes feedback network 212, all of which are described greater detail below.

Primary voltage regulator 210 provides output voltages to transistors 240 and 242. In one embodiment, transistor 240 is a p-channel enhancement-mode insulated gate field effect transistor (IGFET) and transistor 242 is an n-channel enhancement-mode IGFET. The drain of transistor 240 and the drain of transistor 242 are commonly coupled to a first terminal of inductor 244. The second terminal of inductor 244 is coupled to load 200 through node 248. Capacitor 246 is coupled between node 248 and ground. Of course, other components can also be used to provide the functionality of primary voltage regulator 210.

The voltage output at node 248 is input to feedback network 212. In one embodiment, feedback network 212 is part of primary voltage regulator 210; however, feedback network 212 can be a separate device. In one embodiment, feedback network 212 provides control of secondary voltage regulator 220 when secondary voltage regulator 220 is present. Feedback network 212 can also be used to control a tertiary voltage regulator (not shown in FIG. 2).

In one embodiment, primary voltage regulator 210 is physically located on the same card device as load 200 and secondary voltage regulator 220 is physically located on a computer system motherboard some distance away from load 200. Alternatively, primary voltage regulator 210 is located on a computer system motherboard near load 200 and secondary voltage regulator 220 is located on the computer system motherboard farther from load 200 then primary voltage regulator 210. Of course, other placements can also be used.

Secondary voltage regulator 220 is coupled to feedback network 212, which controls operation of secondary voltage regulator 220. In one embodiment, feedback network 212 enables and disables secondary voltage regulator 220 based on the voltage at node 248 such that secondary voltage regulator 220 operates as a pulse width modulated circuit. In one embodiment, secondary voltage regulator 220 provides two signals to primary voltage regulator 210. The first, labeled 222, indicates whether secondary voltage regulator 220 is present. This signal can be used, for example, when secondary voltage regulator 220 may not be available at all times and indicates whether feedback network 212 should control a secondary voltage regulator.

The second signal provided by secondary voltage regulator 220, labeled 224, is an optional signal that indicates the status of secondary voltage regulator 220. In one embodiment, this signal indicates whether secondary voltage regulator 220 is enabled. By providing a signal between secondary voltage regulator 220 and primary voltage regulator 210, feedback network 212 can determine whether secondary voltage regulator 220 is enabled prior to the voltage at node 248 changing.

When enabled by feedback network 212, secondary voltage regulator 220 provides additional power when the voltage at node 248 drops below a predetermined level. Power is supplied through transistors 230 and 232, inductor 234 and capacitor 236 in a manner similar to primary voltage regulator 210. In one embodiment, the components of voltage regulator 220, transistors 230 and 232, inductor 234 and capacitor 236 are lower efficiency, higher capacity components than the components of primary voltage regulator 210. In one embodiment, secondary voltage regulator 220 provides 12 Watts of power.

By providing two voltage regulators having different efficiencies and different capacities the overall performance of the associated system can be improved. For example, primary voltage regulator can provide 8 Watts of power to load 200 and secondary voltage regulator can provide 12 Watts of power to load 200. Thus, when both primary voltage regulator 210 and secondary voltage regulator 220 are operating load 200 can be supplied with up to 20 Watts of power.

Such a configuration can be useful, for example, in the mobile computer system where primary voltage regulator 210 operates when power is supplied from battery. Secondary voltage regulator 220 can be used when the mobile computer system is connected to an external power source. Thus, when an unlimited power supply is provided less efficient, higher capacity components are used to provide or power to load 200 and thereby increase performance of load 200.

Figure 3:
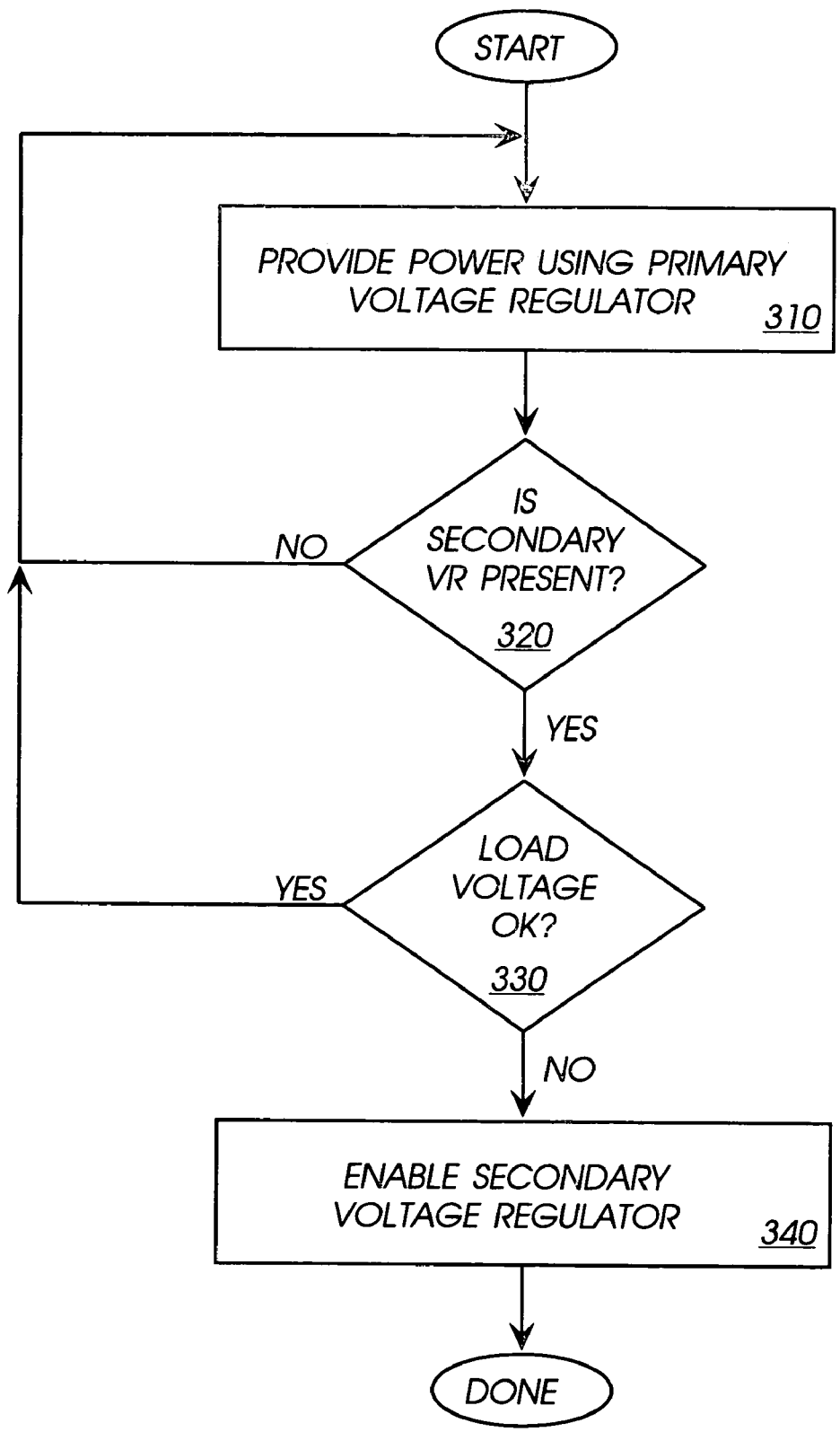
FIG. 3 is one embodiment of a flow diagram for providing power to a single load using two voltage regulators.

FIG. 3 is one embodiment of a flow diagram for providing power to a single load using two voltage regulators. Initially, power is provided using a primary voltage regulator, 310. In one embodiment, the primary voltage regulator determines whether a secondary voltage regulator is present, 320. Alternatively, other system components can determine whether the secondary voltage regulator is present. If the secondary voltage regulator is not present, power is provided using the primary voltage regulator only.

If a secondary voltage regulator is present the voltage supplied to the load is monitored, 330. If the load voltage is within an acceptable range, power is provided using the primary voltage regulator only. If the load voltage is not within the acceptable range, for example, if the voltage is to low the secondary voltage regulator is enabled, 340.

The secondary voltage regulator provides additional power to the load when enabled. In one embodiment, secondary voltage regulator is enabled based on operating conditions including, but not limited to, presence of external power sources, operating frequencies and load impedance. In one embodiment, the secondary voltage regulator is enabled in a pulse width modulated manner; however, other patterns can be used.

Figure 4:
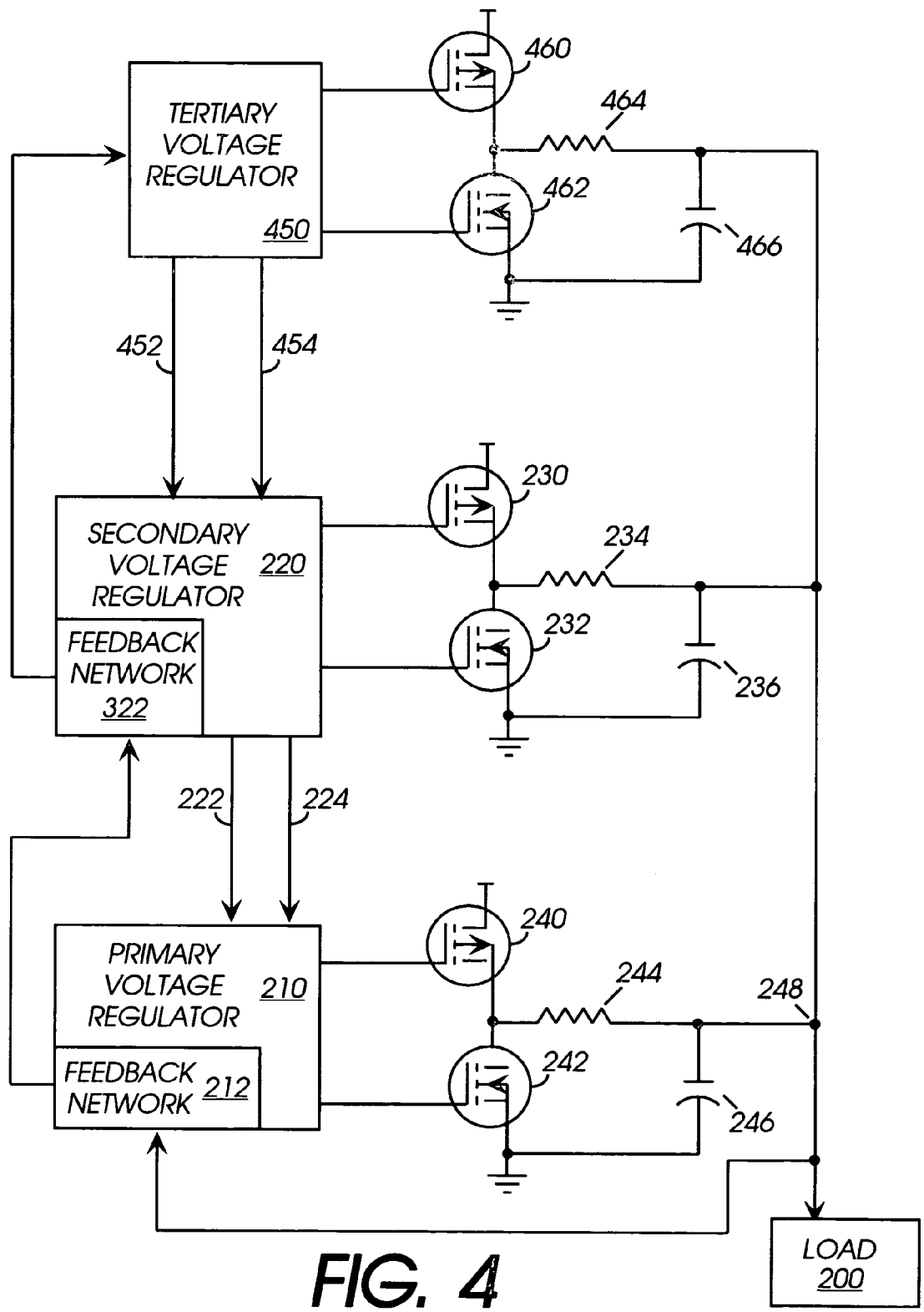
FIG. 4 is one embodiment of a system having a single load and three voltage regulators.

FIG. 4 is one embodiment of a system having a single load and three voltage regulators. Primary voltage regulator 210 of FIG. 4 operates in the same manner as primary voltage regulator 210 of FIG. 2. In one embodiment, secondary voltage regulator 220 of FIG. 4 operates in the same manner as secondary voltage regulator 220 of FIG. 2 with the addition of feedback network 322 and is configured to receive signals from tertiary voltage regulator 450. In an alternative embodiment, tertiary voltage regulator 450 is controlled by feedback network 212.

Feedback network 322 can be part of secondary voltage regulator 220, or feedback network 322 can be a separate system component. Feedback network 322 operates to control tertiary voltage regulator 450. In one embodiment, feedback network 322 receives a control signal from feedback network 212.

When enabled, tertiary voltage regulator 450 provides power to load 200 through transistors 460 and 462, inductor 464 and capacitor 466. In one embodiment, tertiary voltage regulator 450 provides the signal via line 452 to secondary voltage regulator 220 to indicate the presence of tertiary voltage regulator 450. In an alternative embodiment tertiary voltage regulator 450 provides the signal to primary voltage regulator 210.

Tertiary voltage regulator 450 can also provide a signal via line 454 indicating the status of tertiary voltage regulator 450. In one embodiment, the status indicator provides feedback to secondary voltage regulator 220 indicating whether tertiary voltage regulator 450 is enabled. In an alternative embodiment the status indicator is provided to primary voltage regulator 210.

A three voltage regulator system can be used, for example, with a mobile computer system and docking station 117. Primary voltage regulator 210 can be physically located near load 200, for example, on a processor daughter card. Secondary voltage regulator 220 can be physically located farther from load 200, for example, on the mobile computer system motherboard. Tertiary voltage regulator 450 can be located, for example, in a docking station 117.

In a two voltage regulator system, the secondary voltage regulator can provide additional power to the load. However, because of thermal considerations, he mobile computer system having two voltage regulators and connected to an external power source may not provide desktop-equivalent performance. In a three voltage regulator system be tertiary voltage regulator can be connected to a thermal dissipation arrangement that allows the three voltage regulators to provide the load with enough power and thermal dissipation capacity to operate at peak performance.

Figure 5:
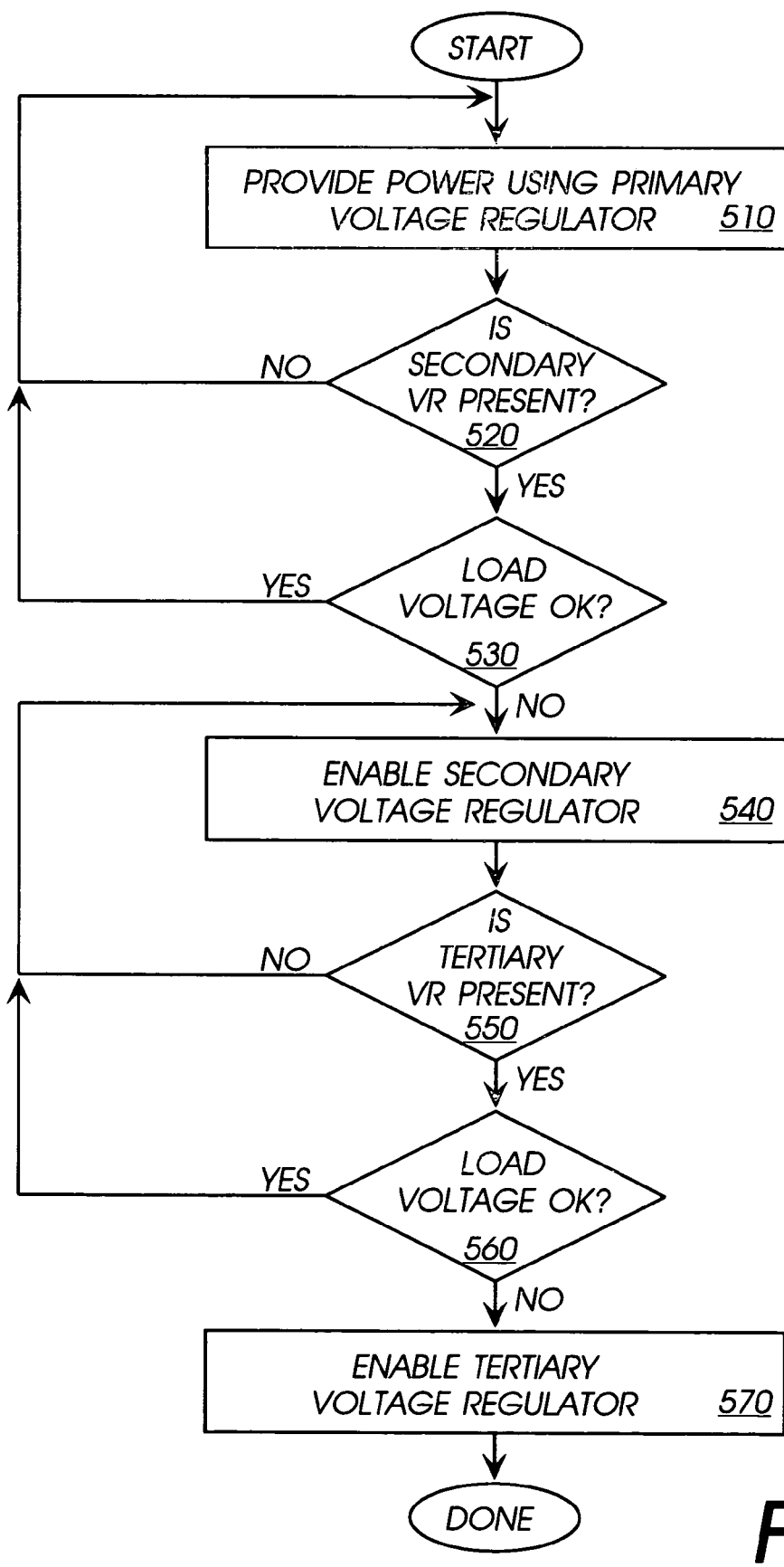
FIG. 5 is one embodiment of a flow diagram for providing power to a single source using three voltage regulators.

FIG. 5 is one embodiment of a flow diagram for providing power to a single source using three voltage regulators. Power is initially provided using a primary voltage regulator, 510. In one embodiment, the primary voltage regulator determines whether a secondary voltage regulator is present, 520. If not, power is provided using the primary voltage regulator only.

If a secondary voltage regulator is present the feedback network of the primary voltage regulator determines whether the load voltage is within an acceptable range, 530. If so, the secondary voltage regulator is not enabled. If the load voltage is not within the acceptable range, the secondary voltage regulator is enabled, 540.

In one embodiment, the secondary voltage regulator determines whether the tertiary voltage regulator is present, 550. If not, power supplied using the primary and secondary voltage regulators. If the tertiary voltage regulator is present the feedback network of either the primary voltage regulator or the secondary voltage regulator determines whether load voltage is within this acceptable range, 560. If so, the tertiary voltage regulator is not enabled.

If both the primary voltage regulator and secondary voltage regulator are enabled and load voltage is not within acceptable range, the tertiary voltage regulator is enabled, 570. In one embodiment, the tertiary voltage regulator is enabled by the feedback network of the secondary voltage regulator in a pulse width modulated manner. However, the tertiary voltage regulator can be enabled in another manner.

In the foregoing specification, the present invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. An apparatus comprising:
   an output node to coupled to a load;
   a primary voltage regulator to provide primary power to the output node from at least one of a first power source or a second power source;
   a secondary voltage regulator to selectively provide additional power to the output node from the second power source based at least in part on availability of the second power source;
   a first transistor receiving an input from the primary voltage regulator, wherein the first transistor is coupled to a first terminal of a first inductor, and a second terminal of the first inductor is connected to the output node, such that the primary and secondary voltage regulators are coupled to the output node in parallel;
   a second transistor receiving an input from the secondary voltage regulator wherein the second transistor is coupled to a first terminal of a second inductor and a second terminal of the second inductor is connected to the output node;
   wherein, the secondary voltage regulator has a greater power capacity than the primary voltage regulator; and the apparatus further comprises:
   first and second feedback networks to detect power supplied to the output node and to control the primary and secondary voltage regulators, and to detect if the second power source is available, and to detect if a load power reaches a threshold level, and wherein the first and second feedback networks monitor operating conditions of the apparatus, and wherein the first and second feedback networks enable the secondary voltage regulator to supply additional power to the output node if the second power source is available and the load power reaches a threshold level or the operating conditions require the additional power.

2. The apparatus of claim 1 further comprising:
   a tertiary voltage regulator to detachably couple with the load, said tertiary voltage regulator to selectively provide further additional power to the load from the second power source based at least in part on availability of the second power source, the tertiary voltage regulator has a greater power capacity and is less efficient than the secondary voltage regulator.

3. The apparatus of claim 2 further comprising:
a mobile computer, said mobile computer containing the primary voltage regulator, the secondary voltage regulator, and the load; and
a docking station to detachably receive the mobile computer, said docking station containing the tertiary voltage regulator.

4. The apparatus of claim 3 further comprising:
a thermal dissipation device in the docking station to dissipate heat from the tertiary voltage regulator.

5. The apparatus of claim 2 wherein the feedback circuit in the primary voltage regulator to control the secondary voltage regulator to provide the additional power if a load power reaches a first threshold level and the second power source is available, and to control the tertiary voltage regulator to provide the further additional power if the load power reaches a second threshold level and both the tertiary voltage regulator and the second power source are available.

6. The apparatus of claim 2 wherein the load has at least a low performance mode, a medium performance mode, and a high performance mode, and wherein the low performance mode uses the primary power, the medium performance mode uses the primary power plus the additional power, and the high performance mode uses the primary power plus the additional power plus the further additional power.

* * * * *